United States Patent
Choi et al.

(10) Patent No.: US 9,144,102 B2
(45) Date of Patent: Sep. 22, 2015

(54) DEACTIVATING OR MAINTAINING A PACKET DATA NETWORK CONNECTION

(71) Applicant: RESEARCH IN MOTION LIMITED, Waterloo (CA)

(72) Inventors: Noun Choi, Flower Mound, TX (US); Jan Hendrik Lucas Bakker, Irving, TX (US); Rene Waraputra Purnadi, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 213 days.

(21) Appl. No.: 13/854,341

(22) Filed: Apr. 1, 2013

(65) Prior Publication Data

US 2014/0293882 A1 Oct. 2, 2014

(51) Int. Cl.
*H04W 74/04* (2009.01)
*H04W 76/04* (2009.01)

(52) U.S. Cl.
CPC .................................. *H04W 76/04* (2013.01)

(58) Field of Classification Search
None
See application file for complete search history.

(56) References Cited

U.S. PATENT DOCUMENTS

| | | | |
|---|---|---|---|
| 2008/0102896 A1 | 5/2008 | Wang | |
| 2010/0216484 A1 | 8/2010 | Zhou | |
| 2010/0272013 A1* | 10/2010 | Horn et al. | 370/328 |
| 2011/0171953 A1* | 7/2011 | Faccin et al. | 455/426.1 |
| 2011/0310799 A1* | 12/2011 | Horn et al. | 370/328 |
| 2012/0076121 A1 | 3/2012 | Choi | |
| 2012/0189016 A1 | 7/2012 | Bakker | |
| 2013/0230024 A1* | 9/2013 | Lim et al. | 370/331 |
| 2013/0308527 A1* | 11/2013 | Chin et al. | 370/328 |

FOREIGN PATENT DOCUMENTS

| | | |
|---|---|---|
| KR | 20100119349 | 11/2010 |
| WO | 2012044628 | 4/2012 |
| WO | 2012050841 | 4/2012 |
| WO | 2012050842 | 4/2012 |
| WO | 2012050845 | 4/2012 |

OTHER PUBLICATIONS

3GPP TR 21.905 V11.3.0 Technical Report 3rd Generation Partnership Project; Technical Specification Group Services and System Aspects; Vocabulary for 3GPP Specifications (Release 11) (Dec. 2012) (64 pages).
3GPP TS 22.101 V12.4.0 Technical Specification 3rd Generation Partnership Project; Technical Specification Group Services and System Aspects; Service aspects; Service principles (Release 12) (Mar. 2013) (68 pages).

(Continued)

*Primary Examiner* — Jackie Zuniga Abad
*Assistant Examiner* — Lakeram Jangbahadur
(74) *Attorney, Agent, or Firm* — Trop Pruner & Hu, P.C.

(57) ABSTRACT

A packet data network (PDN) gateway receives a message associated with a user equipment (UE) having a PDN connection. The PDN gateway determines whether the UE is accessing a network node that has a predetermined association with the PDN gateway based on the message. In response to the determination, the PDN connection is maintained or deactivated.

19 Claims, 10 Drawing Sheets

(56) References Cited

OTHER PUBLICATIONS

3GPP TS 23.003 V11.0.0; 3rd Generation Partnership Project; Technical Specification Group Core Network and Terminals; Numbering, Addressing and Identification; Release 11; Dec. 2011; 81 pages.
3GPP TS 22.220 V11.6.0 Technical Specification 3rd Generation Partnership Project; Technical Specification Group Services and System Aspects; Service requirements for Home Node B (HNB) and Home eNode B (HeNB) (Release 11) (Sep. 2012) (25 pages).
3GPP TS 23.203 V11.4.0; 3rd Generation Partnership Project; Technical Specification Group Services and System Aspects; Policy and Charging Control Architecture; Release 11; Dec. 2011; 167 pages.
3GPP TS 24.301 V11.1.0; 3rd Generation Partnership Project; Technical Specification Group Core Network and Terminals; Non-Access-Stratum (NAS) Protocol for Evolved Packet System (EPS); Stage 3; Release 11; Dec. 2011; 326 pages.
3GPP TS 23.060 V12.0.0 Technical Specification 3rd Generation Partnership Project; Technical Specification Group Services and System Aspects; General Packet Radio Service (GPRS); Service description; Stage 2 (Release 12) (Mar. 2013) (338 pages).
3GPP TS 23.401 V12.0.0 Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 12) (Mar. 2013) (290 pages).
3GPP TR 23.830 V9.0.0; 3rd Generation Partnership Project; Technical Specification Group Services and System Aspects; Architecture Aspects of Home NodeB and Home eNodeB; Release 9; Sep. 2009; 55 pages.
3GPP TS 29.274 V11.1.0; 3rd Generation Partnership Project; Technical Specification Group Core Network and Terminals; 3GPP Evolved Packet System (EPS); Evolved General Packet Radio Service (GPRS); Tunnelling Protocol for Control Plane (GTPv2-C): Stage 3; Release 11; Dec. 2011; 202 pages.
3GPP TS 32.251 V11.1.0; 3rd Generation Partnership Project; Technical Specification Group Services and System Aspects; Telecommunication Management; Charging Management; Packet Switched (PS) Domain Charging; Release 11; Dec. 2011; 82 pages.
3GPP TS 36.300 V11.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Dec. 2011; 194 pages.
3GPP TSG-SA WG1 Meeting #49; "SIPTO Requirements Common for Macro Network and H(e)NB Subsystems"; S1-100321; Beijing, China; Nov. 16-20, 2009; 3 pages.
3GPP TSG-SA WG1 Meeting #49; "Mobility for Local IP Access (LIPA)"; S1-100316; San Francisco, USA; Feb. 22-26, 2010; 2 pages.
3GPP TSG SA WG2 Meeting #75; "LIPA and SIPTO Node Functions"; S2-096050; Kyoto, Japan; Aug. 31-Sep. 4, 2009; 8 pages.
3GPP TSG SA WG2 Meeting #75; "Terminology Updated to Agreed Text in TR 23.8xy"; S2-096006; Kyoto, Japan; Aug. 31-Sep. 4, 2009; 5 pages.
3GPP TSG SA WG2 Meeting #75; "Architectural Requirements of Internet Offload"; S2-095900; Kyoto, Japan; Aug. 31-Sep. 4, 2009; 3 pages.
3GPP TR 23.829 V10.0.0 (Mar. 2011) Technical Report 3rd Generation Partnership Project; Technical Specification Group Services and System Aspects; Local IP Access and Selected IP Traffic Offload (LIPA-SIPTO) (Release 10) (43 pages).
3GPP TR 23.859 V12.0.0 Technical Report 3rd Generation Partnership Project; Technical Specification Group Services and System Aspects; Local IP access (LIPA) mobility and Selected IP Traffic Overload (SIPTO) at the local network (Release 12) (Mar. 2013) (68 pages).
3GPP TSG SA WG2 Meeting #94 S2-124456 New Orleans, USA—Nov. 12-16, 2012 Source: Huawei, Hisilicon Title: Idle state mobility for Local PDN connection for SIPTO@LN Document for: Discussion/Approval Agenda Item: 8.5 Work Item / Release: LIMONET/Rel-12 (3 pages).
3GPP TSG SA WG2 Meeting #94 S2-124457 New Orleans, USA—Nov. 12-16, 2012 Source: Huawei, Hisilicon Title: Connected state mobility of local PDN connection for SIPTO@LN Document for: Approval Agenda Item: 8.5 Work Item / Release: LIMONET / Rel-12 (2 pages).
3GPP TSG-SA2 Meeting #95 S2-130291 Prague, Czech Republic, Jan. 28-Feb. 1, 2013 (revision of S2-13xxxx) CR-Form-v10 Change Request 23.401 CR 2504 rev—Current version: 11.4.0 Proposed change affects: UICC apps ME Radio Access Network X Core Network X Title: Introduction of SIPTO at the Local Network with collocated Local Gateway function Source to WG: Intel, Huawei Hisilicon, AT@T, Verizon, Qualcomm Incorporated Source to TSG: SA2 Work item code: LIMONET—Date: Jan. 22, 2013 (27 pages).
SA WG2 Meeting #95 S2-130314 Prague, Czech Republic—Jan. 28-Feb. 1, 2013 (revision of S2-13xxxx) CR-Form-v10 Change Request 23.401 CR 2506 rev—Current version: 11.4.0 Title: SIPTO@LN PDN connection deactivation with "reactivation requested" indication Source to WG: Research in Motion UK Limited—Source to TSG: SA WG2 Work item code:LIMONET Date Jan. 28, 2013 (6 pages).
3GPP TSG-SA2 Meeting #95 S2-130657 Prague, Czech Republic, Jan. 28-Feb. 1, 2013 (revision of S2-130561) CR-Form-v10 Change Request 23.401 CR 2508 rev 1 Current version: 11.4.0—Title: Support of SIPTO at the Local Network Source to WG: Intel, Huawei, Hisilicon, Ericsson, ST Ericsson, Alcatel-Lucent, AT&T, Verizon, Qualcomm Incorporated, LG Electronics, CATT Source to TSG: SA2 Work item code: LMONET—Date: Jan. 31, 2013 (32 pages).
3GPP TS 23.272 V11.4.0 Technical Specification 3rd Generation Partnership Project; Technical Specification Group Services and System Aspects; Circuit Switched (CS) fallback in Evolved Packet System (EPS); Stage 2 (Release 11) (Mar. 2013) (91 pages).
3GPP SA WG2 TD Meeting #77, TD S2-100007, Shenzhen, China, Source: ZTE Title: Proposed solution of architecture variant 1 Document for: Approval Agenda Item: 9.1 Work Item / Release:LIPA__SIPTO/ Rel-10, Jan. 18-22, 2010 (6 pages).
3GPP TSG SA WG2 Meeting #78, TD S2-101737, San Francisco, USA Source: Qualcomm Incorporated, Alcatel Lucent, ZTE Title: Further analysis for LIPA/SIPTO solution for H(e)NB using a local PDN connection in Solution 1 Document for: Approval Agenda Item: 9.1 Work Item / Release: LIPA__SIPTO/Rel-10, Feb. 22-26, 2010 (16 pages).
3GPP TSG SA WG2 Meeting #79, TD S2-102386, Kyoto, Japan Source: SAMSUNG Title: Fix LIPA open issues Document for: Approval / Discussion Agenda Item: 9.1 Work Item / Release:LIPA__SIPTO / Rel-10, May 10-14, 2010 (8 pages).
3GPP TSG SA WG2 Meeting #80, S2-103361 Brundstad, Change Request 23.401 CR 1647, 10.0.0, Title: LIPA deactivation, SAMSUNG, Verizon Wireless, Qualcomm Incorporated, LG Electronics, Aug. 3-Sep. 3, 2010 (10 pages).
3GPP TSG SA WG2 Meeting #80, S2-103362 Brundstad, Change Request 23.060 CR 1124, 10.0.0, LIPA deactivation, SAMSUNg, Verison Wireless, Qualcomm Incorporated, LG Electronics, Aug. 30-Sep. 3, 2010 (14 pages).
3GPP TSG SA WG2 Meeting #80, S2-104392 Brunstad, Norway CR-Form-v9.6 Change Request, 23.401 CR 1644 10.0.0, LIPA permissions and CSG information for LIPA-able APNs in the HSS, LG Electronics, Alcatel-Lucent, Panasonic, Verizon Wireless, Aug. 30-Sep. 3, 2010 (7 pages).

* cited by examiner

DEACTIVATING OR MAINTAINING A PACKET DATA NETWORK CONNECTION

BACKGROUND

A mobile communications network includes cells with which user equipments (UEs) are able to communicate wirelessly. Each cell includes a wireless access network node that is accessible by UEs.

Femtocells are being developed for use in various applications. A femtocell has a relatively small coverage area, which is generally smaller than the coverage area of a regular cell. Femtocells are generally designed for use in private premises, such as a private home, premises of a business concern or other organization, and so forth.

BRIEF DESCRIPTION OF THE DRAWINGS

Some embodiments are described with respect to the following figures.

DETAILED DESCRIPTION

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards. Although reference is made to LTE in the ensuing discussion, it is noted that techniques or mechanisms according to some implementations can be applied to other wireless access technologies. For example, such other wireless access technologies can include Universal Mobile Telecommunications System (UMTS) technologies, which is also referred to as the Universal Terrestrial Radio Access (UTRA), or other types of wireless access technologies.

User equipments (UEs) attached to cells of a mobile communications network can access services provided by a packet data network, such as the Internet or another type of packet data network. Services provided by a packet data network can include web browsing services, online printing services, file download services, and so forth. Examples of UEs include computers, smart phones, personal digital assistants, game appliances, or other electronic devices that are able to perform wireless communications.

To access services provided by a packet data network, a UE can establish a packet data network (PDN) connection with a network node in a core network of the mobile communications network. For example, in an E-UTRA network, the UE can establish a PDN connection with a PDN gateway (which is part of the core network) to communicate with a PDN. A PDN is identified by an Access Point Name (APN). Examples of PDNs include general purpose networks such as the Internet, or more special purpose networks such as an IP Multimedia Subsystem (IMS). As another example, in a UTRA network, the UE can establish a PDN connection (or more specifically, a Packet Data Protocol (PDP) context) with a Gateway GPRS (General Packet Radio Service) Support Node (GGSN), which is part of the core network.

Although the present discussion refers to a PDN gateway in an E-UTRA network, it is noted that the term "PDN gateway" can refer to other network nodes in other types of mobile communications networks. For example, in a UTRA network, a PDN gateway can refer to a GGSN. More generally, a PDN gateway can refer to a network node that enables connectivity between a packet data network and a UE in a mobile communications network.

A PDN connection can provide a connection to a packet data network that is identified by an access point name (APN). An APN can identify a packet data network that a UE can communicate with.

A mobile communications network can include femtocells in addition to regular cells (sometimes referred to as macro cells). Femtocells are generally used in private premises, such as a residential home, premises of a business concern or other organization, and so forth. One or multiple femtocells can be part of a local network, such as a home network in a residential home, a corporate network of a business concern, and so forth. A regular cell (or macrocell) has a coverage area that is generally larger than that provided by a femtocell.

Each cell (e.g. a femtocell or a macrocell) includes a wireless access network node that is accessible by UEs. In an E-UTRA network, a wireless access network node that provides a coverage area for wireless communications with UEs is referred to as an enhanced Node B (eNB). In a UTRA network, a wireless access network node is referred to as a Node B (NB). The eNB of a femtocell is referred to as a home eNB (HeNB). An NB of a femtocell is referred to as a home NB (HNB). An HNB or HeNB (i.e. H(e)NB) provides the same functions as an NB or eNB, respectively, possibly with certain exceptions.

In the ensuing discussion, although reference is made to eNBs and HeNBs, it is noted that techniques or mechanisms according to some embodiments can also be applied to other types of wireless access network nodes, such as NBs and HNBs in a UTRA network. As a further example, another type of a wireless access network node is a local eNB (LeNB) for a small cell. Small cells, which also have small coverage areas relative to macrocells, can be provided in a wireless communications network to provide data communication offload capabilities, where data communications of a macro cell can be offloaded (i.e. handed over from the macrocell) to one or more small cells to allow for increased data communication throughput. As further alternatives, techniques or mechanisms according to some implementations can be applied to a wireless communications network without femtocells or small cells.

Figure 1:
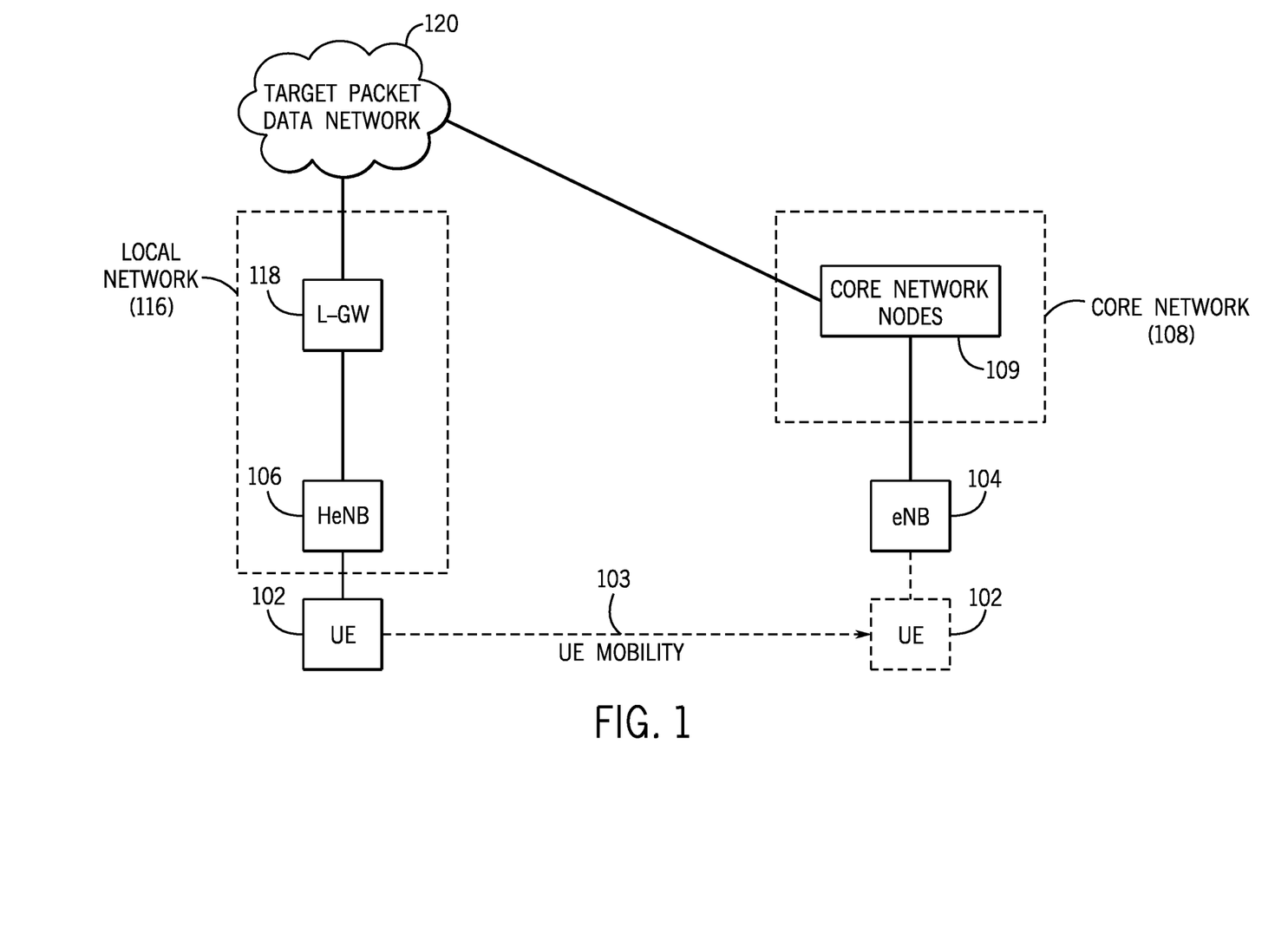
FIGS. 1 and 2 are schematic diagrams of example mobile communications networks according to some implementations.

FIG. 1 shows an example mobile communications network to which a UE 102 can attach. The mobile communications network includes an eNB 104 and an HeNB 106. The procedures utilized between an HeNB and a core network 108 (which includes core network nodes 109) of the mobile communications network can be the same as those between an eNB and the core network 108. Although just one HeNB 106 and eNB 104 is shown in FIG. 1, it is noted that multiple HeNBs and multiple eNBs can be present.

As shown in FIG. 1, the HeNB 106 is part of a local network 116. A local network 116 can be a home network, a corporate network, or other network that is served by one or more HeNBs. In other examples, the HeNB 106 can be an eNB.

When the UE 102 is connected to the HeNB 106, the UE may benefit from obtaining local connectivity (e.g. direct connectivity) to an internal Internet Protocol (IP) network (not shown) that resides in (internal to) the local network 116. For example, an application in the UE may wish to print to a local printer that is attached to the internal IP network. As another example, an application in the UE may wish to download data from a local server in the internal IP network. 3GPP standards provide a feature referred to as Local IP Access (LIPA) connectivity to allow for the UE to obtain local connectivity to access a local service provided by an IP-capable device in the internal IP network.

Another feature supported by 3GPP standards is the concept of selected IP traffic offloading (SIPTO), which allows for the offload of selected types of IP traffic (e.g. Internet traffic) towards a target IP network that is determined based on the UE's point of attachment to an access network. SIPTO allows for the selected types of traffic to bypass the core network 108. SIPTO is applicable to traffic offload for either a macro cell access network provided by eNB(s) or for an access network provided by HeNB(s).

In the example of FIG. 1, the SIPTO feature enables a PDN connection to be established by the UE 102 with a local gateway (L-GW) 118, to allow the UE 102 to access services of a target packet data network 120, which can be a packet data network (e.g. the Internet) external to the core network 108. The ability to establish a PDN connection that bypasses the core network 108 is provided by a "SIPTO at a local network" function. A PDN connection established using the SIPTO at the local network function is referred to as a SIPTO PDN connection. The SIPTO PDN connection allows access of the target packet data network 120 without the user plane of the UE 102 traversing the core network 108. Note that a control node in the core network 108 may still be involved in communicating control signaling messages with the UE 102, even though the SIPTO PDN connection (user plane connection) bypasses the core network 108. A PDN gateway, such as the L-GW 118, can determine if a PDN connection is a SIPTO PDN connection based on the APN of the PDN, or based on explicit signaling from a control node in the core network 108.

The L-GW 118 can be implemented as a standalone gateway, such as in a computing node that is separate from the HeNB 106. In other implementations, the L-GW 118 can be implemented in the same computing node as the HeNB 106; in such implementations, the L-GW 118 is collocated with the HeNB 106. The functions provided by the L-GW 118 can include those of a PDN gateway.

After the UE 102 has established a PDN connection with the L-GW 118, it may be possible for the UE 102 to access a cell that no longer has direct connectivity with the L-GW 118. For example, in implementations where the L-GW 118 is collocated with the HeNB 106, when the UE 102 moves out of the coverage area of the HeNB 106, the UE 102 is attached to another eNB that has no direct connectivity to the L-GW 118. In implementations where the L-GW 118 is a standalone gateway, when the UE 102 moves out of the local network 116 (in other words, the UE 102 has moved to a location that is outside the coverage area of any (H)eNB (HeNB or eNB) in the local network 116), the UE 102 is attached to another eNB that has no direct connectivity to the L-GW 118. As an example, the UE 102 can move to a location within the coverage area of the eNB 104, as indicated by arrow 103.

Deactivation of PDN Connection with L-GW

Once the UE 102 has moved and accesses an eNB that has no direct connectivity to the L-GW 118, an issue to be addressed is how the PDN connection with the L-GW 118 is to be deactivated. A substantial portion of UE traffic is mobile terminating (MT) traffic (traffic that is sent to the UE 102). Generally, the UE 102 expects to continue to receive MT traffic as long as the UE 102 maintains connectivity to a mobile communications network, including when the UE 102 has moved away from the local network 116 and has attached to the eNB 104. To allow the UE 102 to continue to receive MT traffic after deactivation of the PDN connection with the L-GW 118, the UE 102 should be notified (explicitly or implicitly) of the PDN connection deactivation. In response to the notification, the UE 102 can initiate a PDN connection with another network node, such as a core network node 109 in the core network 108 (assuming that the UE 102 has moved within the coverage area of the eNB 104). Note that it is also possible that the UE 102 has moved to another local network that includes another L-GW. In this latter scenario, the UE 102 can initiate another SIPTO PDN connection in the other local network. If the PDN connection being deactivated is the last PDN connection, the UE may detach, followed by attempting the attach procedure. The attach procedure may cause an ATTACH REQUEST message to be sent. The message containing the ATTACH REQUEST message may also cause a PDN connection to be requested and established.

Figure 2:
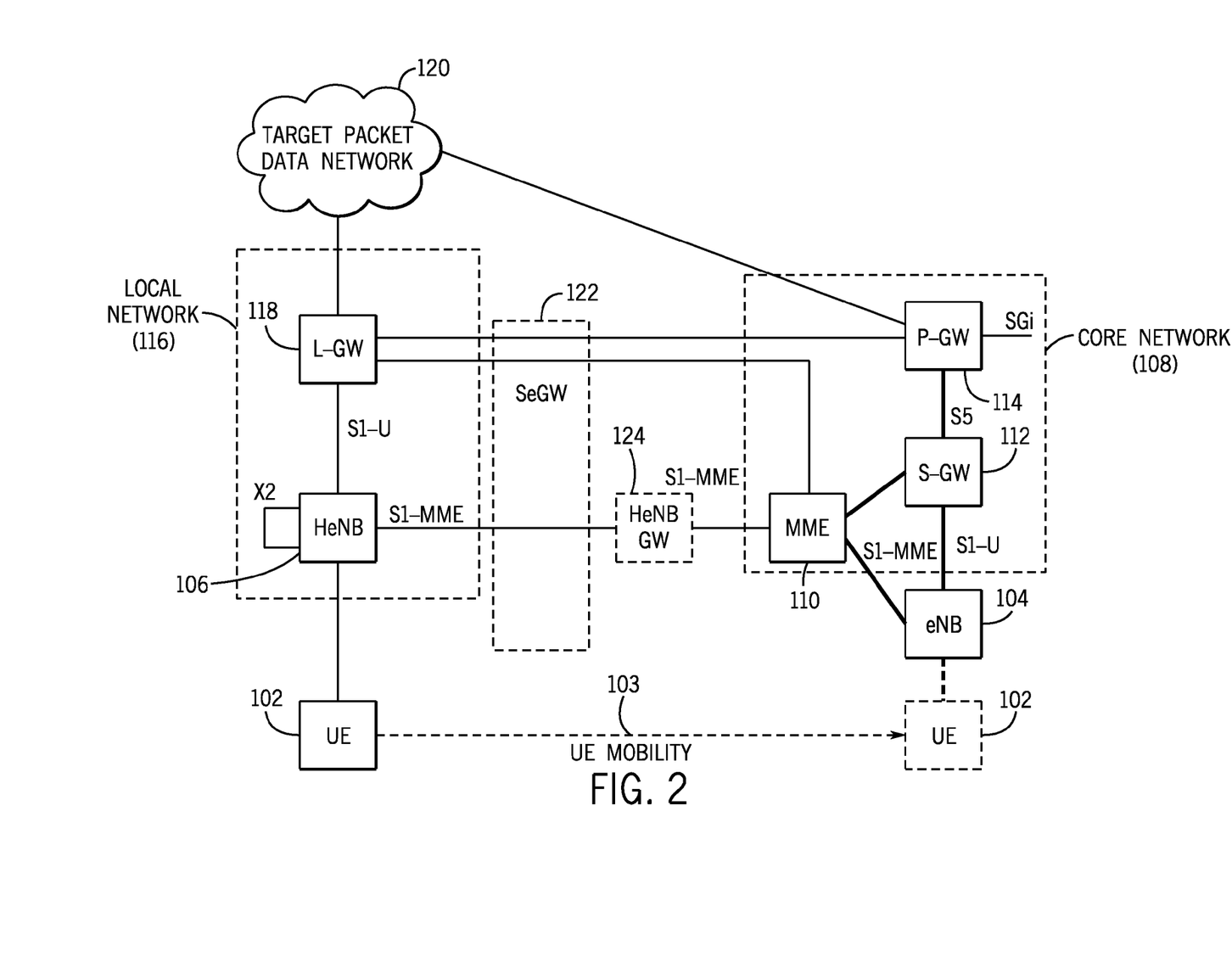

FIG. 2 is a block diagram of a mobile communications network according to further implementations. FIG. 2 depicts additional network nodes that are not shown in the simplified view of FIG. 1.

The core network 108 for an E-UTRA network includes a mobility management entity (MME) 110, a serving gateway (S-GW) 112, and a packet data network gateway (PDN-GW) 114. A PDN-GW is also sometimes referred to as a P-GW. As noted above, in a UTRA network, a PDN-GW can refer to a GGSN. Similarly, in a UTRA network, certain functionalities of an MME can be included in a Serving GPRS Support Node (SGSN).

An MME is a control node for performing various control tasks associated with an E-UTRA network. For example, the MME can perform idle mode UE tracking and paging, bearer activation and deactivation, selection of an S-GW when the UE initially attaches to the E-UTRA network, handover of the UE between eNBs, authentication of a user, generation and allocation of a temporary identity to a UE, and so forth. In other examples, the MME can perform other or alternative tasks.

An S-GW routes and forwards traffic data packets to a UE served by the S-GW. The S-GW can also act as a mobility anchor for the user plane during handover procedures. The S-GW provides connectivity between the UE and a PDN-GW. The PDN-GW is the entry and egress point for data communicated between a UE in the E-UTRA network and a network element coupled to a packet data network, such as the packet data network 120.

When the UE 102 is attached to the HeNB 106, the UE 102 is able to access the packet data network 120 through a PDN connection (more specifically, a SIPTO PDN connection) established with the L-GW 118, which bypasses the core network 108. However, when the UE 102 is attached to the eNB 104, the PDN connection is established with the PDN-GW 114. The network nodes involved in UE communications in the PDN connection established with the PDN-GW 114 are those interconnected by thicker lines in FIG. 2. The eNB 104 communicates traffic data of the UE 102 over an S1-U interface with the S-GW 112. This traffic data in turn is sent by the S-GW 112 over an S5 interface to the PDN-GW 114, which is connected to the packet data network 120.

The S1-U interface is a user plane interface for communicating user plane traffic (e.g. Internet traffic) between an eNB and an S-GW. An S5 interface is an interface for communicating user plane traffic between an S-GW and a PDN-GW. The S1-U and S5 interfaces are defined by the 3GPP standards.

As further shown in FIG. 2, a security gateway (SeGW) 122 can be provided, which can be implemented as a separate physical entity or which can be collocated with an another entity. The SeGW 122 secures the communication from or to the HeNB 106. In addition, an HeNB gateway 124 can also be provided, which serves as a concentrator for the control plane, specifically the S1-MME interface, which is the interface for communicating control plane signaling with the MME 110. The HeNB gateway 124 can be connected to multiple HeNBs.

In some examples, the HeNB gateway 124 can also terminate the user plane towards the HeNB 106 and towards the S-GW 112. In such an arrangement, the HeNB gateway 124 can provide a relay function for relaying user plane data between the HeNB 106 and the S-GW 112. The HeNB gateway 124 can also support a NAS (Non-Access-Stratum) Node Selection Function (NNSF), which performs selection of an MME from among multiple MMEs.

Figure 3:
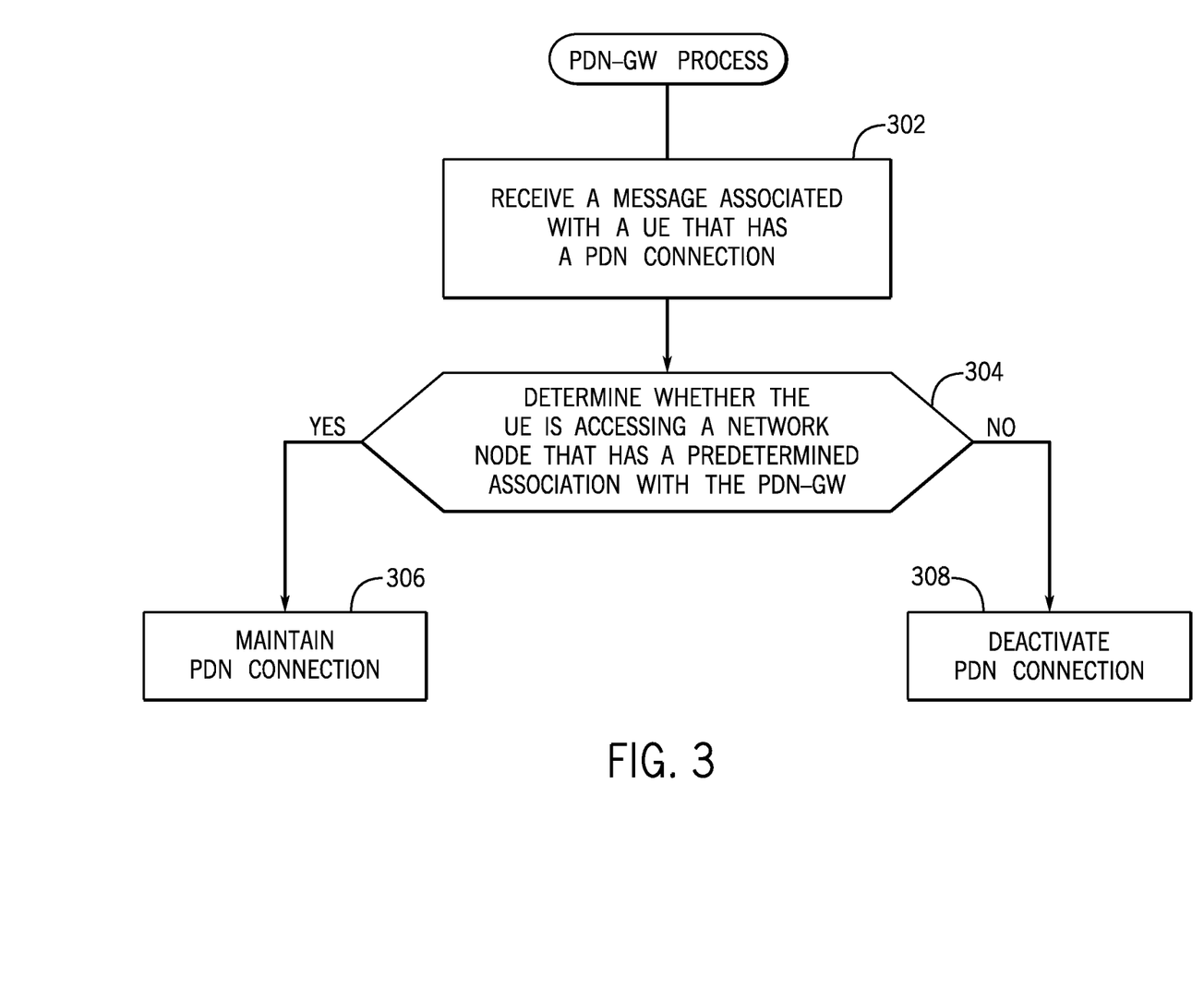
FIG. 3 is a flow diagram of a process of a packet data network (PDN) gateway according to some implementations.

FIG. 3 is a flow diagram of a process performed by a PDN-GW, in accordance with some implementations. The PDN-GW can be the L-GW 118, or can be part of the L-GW 118. Alternatively, the PDN-GW can be a PDN-GW that is outside the local network 116; for example, the PDN-GW can be the PDN-GW 114 in the core network 102.

The PDN-GW receives (at 302) a message associated with a UE (e.g. 102) that has a PDN connection with the PDN-GW. The PDN-GW determines (at 304) whether the UE is accessing a network node (e.g. HeNB 106) that has a predetermined association with the PDN-GW based on the message. In some implementations, the predetermined association may include, but is not limited to, a direct connectivity between the network node and the PDN-GW. In the example of FIG. 2, the HeNB 106 has a direct connectivity with the PDN-GW of the L-GW over an S1-U interface.

The direct connectivity can occur within the same computing node, such as in implementations where the L-GW 118 is collocated with the HeNB 106. Alternatively, the direct connectivity can occur over a network (which can include switches or routers) in implementations where the L-GW 118 is in a separate computing node from the HeNB 106. In implementations where the L-GW 118 is a standalone gateway, the L-GW 118 includes a local S-GW function and a local PDN-GW function. In such an arrangement, the HeNB 106 is connected over an S1-U interface with the local S-GW function, and the local S-GW function is in turn connected over an S5 interface to the local PDN-GW function (similar to the connections depicted among the eNB 104, S-GW 112, and P-GW 114 in FIG. 2). In such an arrangement, the HeNB 106 is still considered to have a direct connection with the local PDN-GW function of the L-GW 118, since the HeNB 106 is able to communicate with the PDN-GW function through the local S-GW function, which is part of an expected path (as provided by 3GPP standards) between the HeNB 106 and the PDN-GW. In other words, in some implementations, the HeNB 106 may be considered to maintain direct connectivity with the local PDN-GW based on the HeNB communicating with PDN-GW function using only a local communication path.

More generally, a network node is considered to have direct connectivity with a PDN-GW if the network node and the PDN-GW are collocated in a computing node, in the arrangement in which the collocated local gateway architecture is used. A network node is considered to have direct connectivity with a PDN-GW if the network node and the PDN-GW have communication path that does not traverse a public network such as the Internet, in the arrangement in which the standalone local gateway architecture is used. In some implementations, the HeNB 106 may be considered to maintain direct connectivity with the local PDN-GW if the communication path between the HeNB 106 and the PDN-GW does not traverse components within the core network. Examples of how a PDN-GW determines if the PDN-GW has a direct connectivity include comparing the identifier of the network node with the list of stored identifiers of the network nodes which have direct connectivity with the PDN-GW, or comparing the identifier of the local network that the network node belongs to the stored local network identifier.

In response to determining that there is a predetermined association (e.g. direct connectivity) between the PDN-GW and the network node, the PDN-GW maintains (at 306) the PDN connection. However, in response to determining that the network node does not have the predetermined association with the PDN-GW, the PDN-GW deactivates (at 308) the PDN connection.

Figure 4:
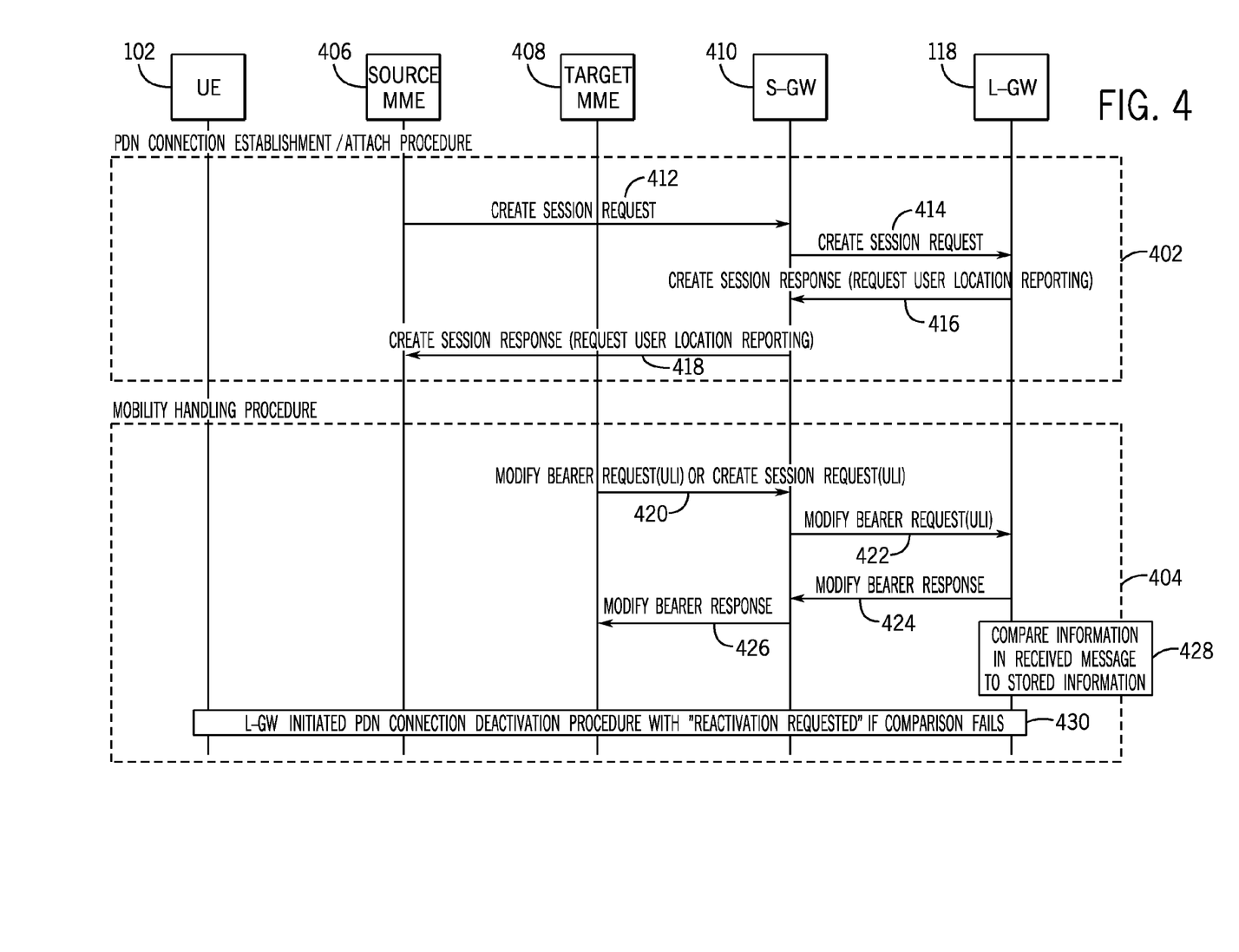
FIG. 4 is a message flow diagram of a PDN connection establishment procedure and mobility handling procedure, according to some implementations.

FIG. 4 is a message flow diagram of a process involving various nodes, according to some implementations. The nodes depicted in FIG. 4 include the UE 102, a source MME 406, a target MME 408, an S-GW 410, and the L-GW 118. The FIG. 4 example assumes that mobility of the UE 108 has caused the MME serving the UE 108 to change from the source MME 406 to the target MME 408. In other examples, the MME does not change due to mobility of the UE 108.

FIG. 4 depicts a PDN connection establishment/attach procedure 402 and a mobility handling procedure 404. It is assumed that the PDN connection that is being established by the PDN connection establishment/attach procedure 402 is a SIPTO PDN connection between the UE 102 and the L-GW 118. Although certain signaling messages are shown in FIG. 4, it is noted that additional signaling messages are also part of the PDN connection establishment/attach procedure 402 and the mobility handling procedure 404, as provided by 3GPP.

As part of the PDN connection establishment/attach procedure 402, a source MME 402 (which serves the UE 102) sends (at 412) a Create Session Request message to the S-GW 112. The Create Session Request message can be sent in response to UE requested PDN connectivity, and is used as part of the procedure for establishing a PDN connection. The S-GW 112 forwards (at 414) the Create Session Request message to the L-GW 118.

In response, the L-GW 118 sends (at 416) a Create Session Response message to the S-GW 112. In accordance with some embodiments, the Create Session Response message includes an information element requesting an MME to report user location information whenever the UE location changes. Specifically, in some examples, the L-GW 118 can include an MS Info Change Reporting Action (Start) and/or CSG (Closed Subscriber Group) Information Reporting Action (Start) information element in the Create Session Response message.

The S-GW 112 forwards (at 418) the Create Session Response message to the source MME 406. Completion of the PDN connection establishment/attach procedure 402 results in the establishment of a PDN connection between the UE 102 and the L-GW 118.

A PDN connection is considered established, from the perspective of the L-GW 118, when the L-GW 118 responds with a Create Bearer Response message to a Create Bearer Request message (not shown in FIG. 4) from the source MME 406. The Create Bearer Request message is used for creating a bearer for carrying user plane data.

The mobility handling procedure 404 is triggered in response to mobility of the UE 102. In the example of FIG. 4, it is assumed that the mobility of the UE 102 has caused a change in the MME, from the source MME 406 to the target MME 408.

Mobility of the UE 102 can trigger a tracking area update (TAU) in an E-UTRA network. In a UTRA network, a procedure similar to TAU is referred to as a routing area update (RAU). A TAU can be triggered when a UE moves into a cell that is in a tracking area that is not listed in a list of tracking areas associated with the UE.

Mobility of the UE 102 can also trigger a handover procedure, where the handover can involve handover of the UE 102 between different eNBs (such as from the HeNB 106 to the eNB 104), between different MMEs, and/or between different S-GWs.

Mobility of the UE 102 can also trigger a service request procedure, where the UE accesses an eNB (such as a HeNB 106 or an eNB 104), which is different from the eNB the UE accessed before, to perform the service request procedure.

In the example of FIG. 4, it is assumed that mobility of the UE 102 has caused a transition from the source MME 406 to the target MME 408. In other examples, the mobility of the UE 102 does not result in a transition between MMEs.

Since the L-GW 118 has requested user location information (in the Create Session Response message sent at 416), the MME (which is the target MME 408 in the FIG. 4 example) includes a user location information (ULI) information element in a message sent (at 420) from the MME to the S-GW 410. Alternatively, the ULI can be included in a User CSG Information element in the message sent (at 420).

In some implementations, the ULI can include a cell identifier (cell ID) that identifies the cell that the UE 102 is accessing. In other implementations, the ULI can include a local network identifier, which identifies the local network (e.g. 116) that the UE 102 is currently connected to. In other examples, the ULI can include other types of location information that is useable by the L-GW 118 to determine if a UE 102 is accessing a (different) network node (e.g. eNB 104) that does not have a predetermined association with the L-GW 118 (as determined at 304 in FIG. 3).

In examples where S-GW relocation does not occur as part of a TAU, the MME includes the ULI information element in a Modify Bearer Request message (sent at 420) to the S-GW 410. S-GW relocation refers to changing the S-GW serving the UE 102. The MME also includes the ULI information element in a Modify Bearer Request message sent (at 420) to the S-GW 410 as part of a handover procedure.

In different examples, a TAU may have triggered S-GW relocation. In this case, the MME includes the ULI information element in a Create Session Request message sent (at 420) to the S-GW 410.

In each of the foregoing scenarios, the S-GW 410 relays the ULI received from the MME to the L-GW 118 in a Modify Bearer Request message that is sent (at 422) to the L-GW 118. In response to the Modify Bearer Request message, the L-GW 118 sends (at 424) a Modify Bearer Response message to the S-GW 410, which is forwarded (at 426) by the S-GW 410 to the MME (e.g. MME 408) that sent the Modify Bearer Request message or Create Session Request message as discussed above.

On receiving the ULI in the Modify Bearer Request message, the L-GW 118 compares (at 428) information in the received Modify Bearer Request message to location information stored at the L-GW 118. The comparing allows the L-GW 118 to determine if a received ULI (in the received Modify Bearer Request message) does not match the stored location information, or alternatively, that the location information stored at the L-GW 118 is not present in the received Modify Bearer Request message. For example, the L-GW 118 can compare a cell identifier or local network identifier in the received ULI against a list of cell identifiers or a local network identifier stored at the L-GW 118.

The comparison (at 428) fails if the received ULI does not match the stored location information, or alternatively, that the location information stored at the L-GW 118 is not present in the received Modify Bearer Request message. In fact, it may be possible that the ULI information element is not included in the received Modify Bearer Request message, which would lead to failure of the comparison (at 428). Failure of the comparison is an indication that the UE 102 has moved out of the local network 116, and thus, the UE 102 has lost connectivity to the L-GW 118. Stated differently, in some implementations, the UE 102 has moved to a cell that does not have a direct connectivity to the L-GW 118.

In response to the comparison failing, the L-GW 118 initiates (a 430) a PDN connection deactivation procedure. For example, the L-GW 118 can send a Delete Bearer Request message that includes a "reactivation requested" cause value to the UE 102 as part of the deactivation procedure (430). The "reactivation requested" cause value causes the UE 102 to initiate a PDN connection establishment procedure with the same APN (as that of the SIPTO PDN connection that was deactivated by the procedure 430), in response to the UE 102 receiving a message (e.g. Radio Resource Control or RRC message) indicating that the existing PDN connection (SIPTO PDN connection) has been deactivated. If the UE 102 has moved to the eNB 104 that is outside the local network 116, then the new PDN connection is a non-SIPTO PDN connection. However, it is possible that the UE 102 may have moved into another local network with another L-GW, in which case the new PDN connection can be a new SIPTO PDN connection.

The foregoing describes implementations in which the L-GW 118 receives updated ULI in response to mobility of the UE 102. In other implementations, instead of receiving a message containing ULI in response to UE mobility, the L-GW 118 can instead receive uplink data in an uplink message from the S-GW 112 of a core network 108 (FIG. 2).

Figure 5A:
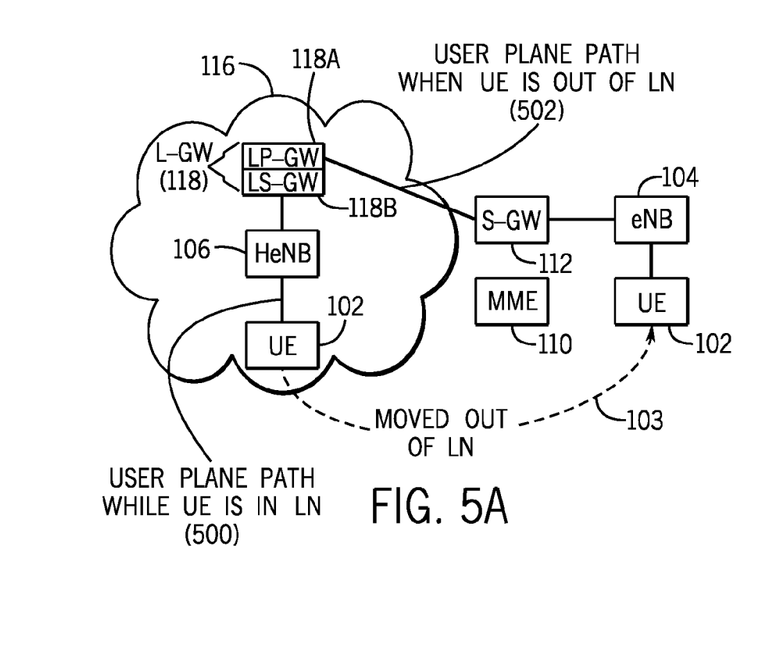
FIGS. 5A-5B are schematic diagrams of example arrangements in which mobility of a user equipment (UE) can trigger deactivation of a PDN connection, according to some implementations.
Figure 5B:
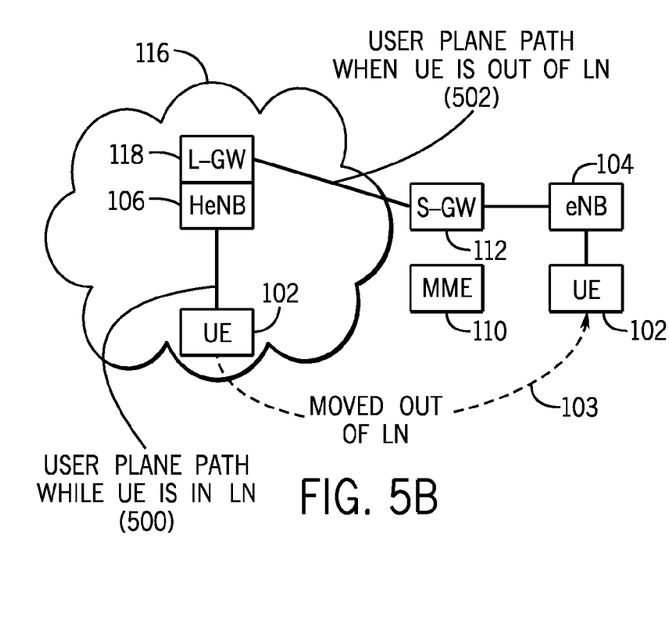

FIGS. 5A and 5B depict a user plane path change when the UE 102 moves from a cell in the local network 116 to a cell outside the local network 116. FIG. 5A shows the example where a standalone L-GW 118 is used. The standalone L-GW 118 includes a local PDN-GW function 118A and a local S-GW function 118B. FIG. 5B shows the example where the L-GW 118 is collocated with the HeNB 106.

In FIG. 5A, the user plane path when the UE 102 is attached to the HeNB 106 in the local network 116 includes a path 500 that traverses through the HeNB 106, local S-GW function 118B, and local PDN-GW function 118A. In FIG. 5B, the user plane path when the UE 102 is attached to the HeNB 106 in the local network 116 includes a path 500 that traverses through the HeNB 106 and the L-GW 118.

Once the UE 102 moves away from the local network 116 and is attached to the eNB 104, the user plane path of the UE 102 includes a path 502 that traverses through the eNB 104, S-GW 112, and local PDN-GW function 118A (FIG. 5A) or L-GW 118 (FIG. 5B).

Thus, in each of FIGS. 5A-5B, after the UE 102 has moved away from the local network 116, the L-GW 118 receives uplink traffic data from the S-GW 112 that is outside the local network 116, rather than from the HeNB 106 in the local network 116.

In FIG. 5A, if the local PDN-GW function 118A detects that it is receiving uplink traffic data from the S-GW 112, as opposed to receiving the uplink traffic data from the local S-GW function 118A, then the PDN-GW function 118A has detected that the UE 102 has moved to a cell that does not have direct connectivity to the local PDN-GW function 118A. In some examples, the determination of which S-GW the local PDN-GW function 118A is receiving data from can be based on a source IP address of an uplink GPRS Tunneling Protocol (GTP) packet, for example. A GTP tunnel can be established between a PDN-GW and an S-GW for carrying data. Each GTP packet includes a source IP address that identifies the source of a packet in the GTP tunnel, and a destination IP address that identifies the destination of a packet in the GTP tunnel. The local S-GW function 118B has an IP address that is different from the IP address of the S-GW 112 that is part of the core network.

In FIG. 5B, if the L-GW 118 detects that it is receiving uplink traffic data from the S-GW 112, as opposed to receiving the uplink traffic data from the collocated HeNB 106, then the L-GW 118 has detected that the UE 102 has moved to a cell that does not have direct connectivity to the L-GW 118. Since the L-GW 118 of FIG. 5B is collocated with the HeNB 106, the L-GW 118 can simply detect whether the uplink traffic data was received from an internal link (inside the platform that includes the collocated HeNB 106 and L-GW 118) or from an external link (to the S-GW 112).

Upon detecting that the UE 102 has moved to a cell that does not have direct connectivity to the L-GW 118, the L-GW 118 can initiate deactivation of the SIPTO PDN connection between the UE 102 and the L-GW 118 using a similar procedure as discussed above. For example, to deactivate the SIPTO PDN connection, the L-GW 118 can send a Delete Bearer Request message with the "reactivation requested" cause value.

It is noted that the various procedures discussed above in connection with FIGS. 3-5B, where the L-GW 118 makes the determination of whether to maintain or deactivate a SIPTO PDN connection in response to UE mobility, can be performed in combination with other techniques or in place of other techniques. For example, such other techniques can deactivation of a SIPTO PDN connection triggered by another network node, such as by an MME (e.g. source or target MME).

"Ping-pong" Effect

If the UE 102 is at the boundary of the local network 116, the UE 102 may leave and enter the local network 116 one or more times within a relatively short period of time. In such a case, the L-GW 118 may deactivate and activate the SIPTO PDN connection in response to the UE leaving and entering the local network 116. This may result in excessive signaling being communicated in the mobile communications network, which may have a negative impact on user experience as user traffic delivery may be delayed during PDN connection deactivation and reactivation with different PDN-GWs (e.g. PDN-GW in the core network 108 and the L-GW 118 in the local network 116).

Figure 6:
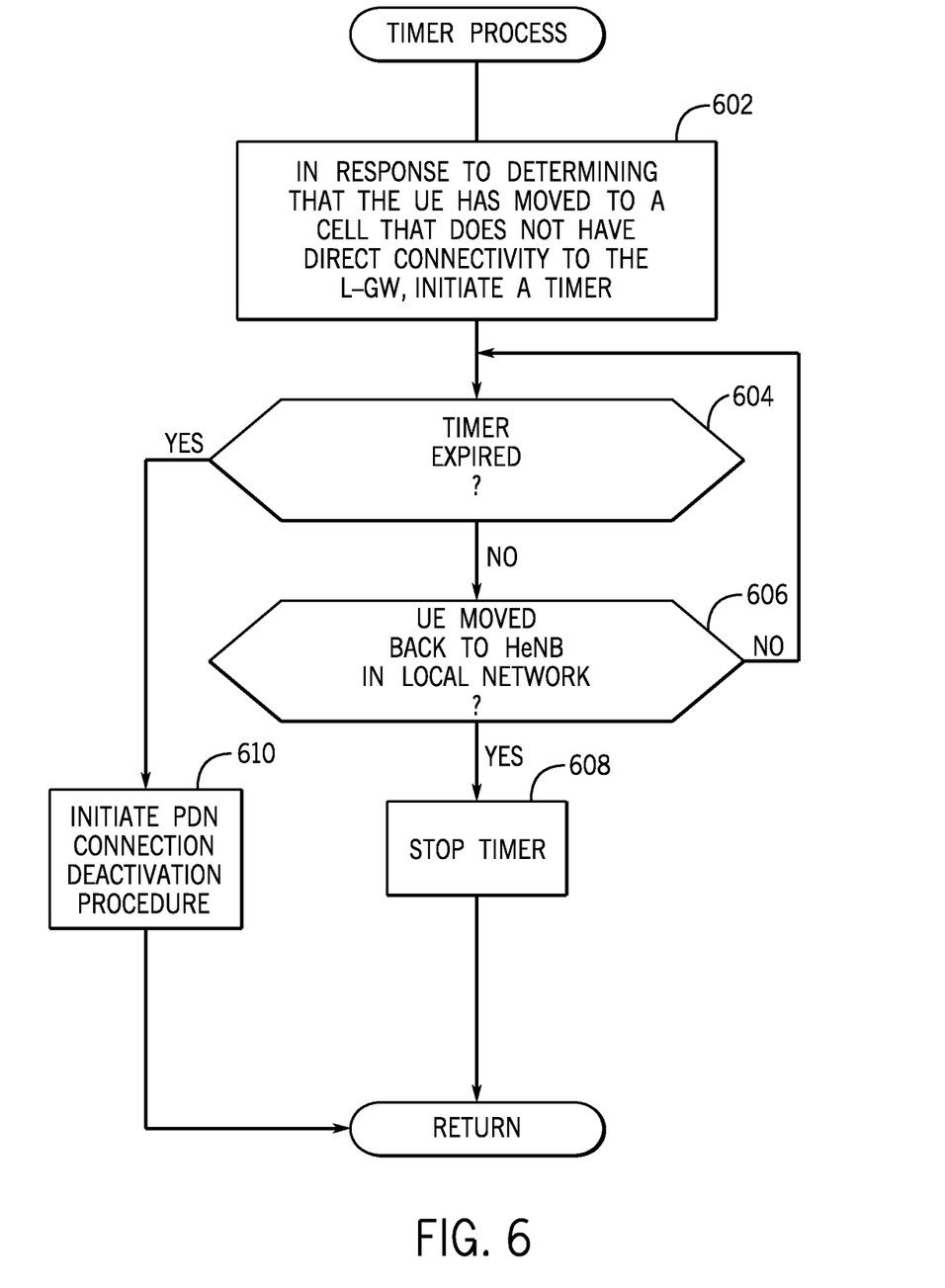
FIG. 6 is a flow diagram of a process of a PDN gateway, according to alternative implementations.

To address the foregoing "ping-pong" effect of the UE 102 leaving the local network 116 and returning to the local network 116 within a predetermined period of time, the L-GW 118 can, using a timer, monitor the time elapsed between the UE 102 leaving the local network 116 and then subsequently returning to the local network 116 and take an action(s) (i.e. execute operation(s)) accordingly. FIG. 6 shows a process for addressing the ping-pong effect. The process of FIG. 6 can be performed by the L-GW 118, or more generally, by a PDN-GW. As shown in FIG. 6, when the L-GW 118 determines that the UE 102 has moved to a cell that does not have direct connectivity to the L-GW 118, using any of the techniques discussed above, the L-GW 118 can initiate (at 602) the timer. The timer can be initiated to an initial low value or an initial high value, and the timer can be incremented or decremented, respectively, from the corresponding initial low value or initial high value. The amount of time counted by the timer 602 is implementation-specific.

The L-GW 118 next determines (at 604) if the timer has expired. If not, the L-GW 118 determines (at 606) whether the UE 102 has moved back to an HeNB that is part of the local network 116. If so, the L-GW 118 stops (at 608) the timer, so that the SIPTO PDN connection is maintained.

If the L-GW 118 determines (at 606) that the UE 102 has not moved back to an HeNB, the L-GW 118 again determines (at 604) if the timer has expired. If the timer expires, the L-GW 118 initiates (at 610) a PDN connection deactivation procedure to deactivate the SIPTO PDN connection, such as by sending the Delete Bearer Request message with the "reactivation requested" cause value.

Modifications of the 3GPP TS 23.401 Specification for Solution 1 (Deactivation Based on ULI)

Figure 7:
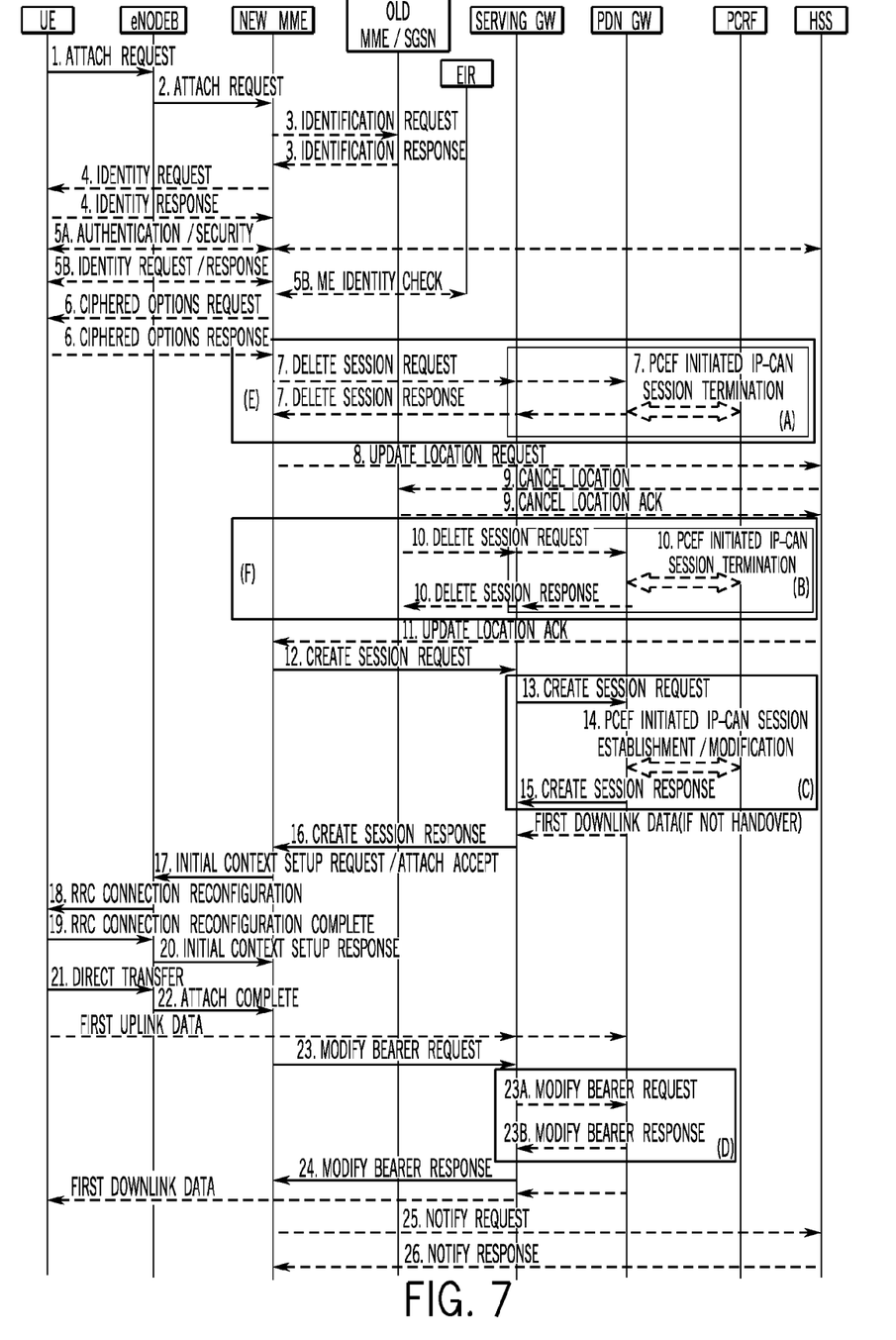
FIGS. 7-9 are example message flow diagrams of various processes according to some implementations.

The following describes example modifications that can be made to the 3GPP TS 23.401 Specification. Those skilled in the art will appreciate that the modifications referenced herein may be applied to various other sections of the 3GPP TS 23.401 Specification and/or other 3GPP specifications as well. FIG. 7 is an example message flow diagram based on a figure relating to an Attach procedure from Section 5.3.2.1 of 3GPP TS 23.401. Step 15 in FIG. 7, which involves a transmission of a Create Session Response message from a PDN-GW to an S-GW, has been modified to include an information element requesting an MME to report user location information whenever the UE location changes. Step 15 in FIG. 7 corresponds to message 416 in FIG. 4. More specifically, the following language (or language similar to the following language) can be added to Section 5.3.2.1 of 3GPP TS 23.401:

If the PDN-GW is an L-GW and the PDN connection is the SIPTO at a Local Network PDN connection, the PDN-GW includes MS Info Change Reporting Action (Start) and/or CSG Information Reporting Action (Start) in the Create Session Request message in step 15.

Figure 8:
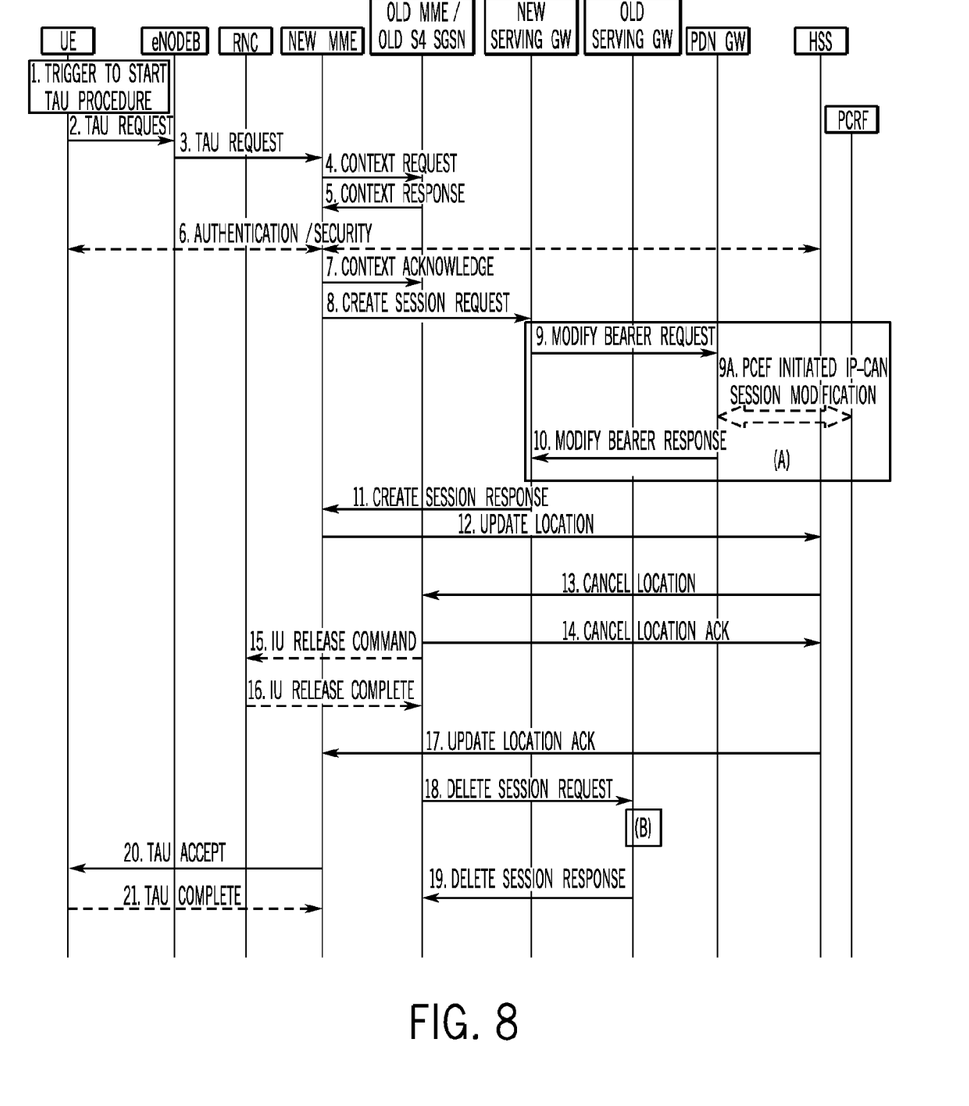

FIG. 8 is an example message flow diagram based on a figure relating to a tracking area update procedure from Section 5.3.3.1 of 3GPP TS 23.401. In FIG. 8, the Modify Bearer Request message in step 9 can include a ULI of the UE, similar to message 422 in FIG. 4, and the PDN-GW can perform the function of task 428 in FIG. 4. Section 5.3.3.1 can be updated to include the following language (or language similar to the following language):

If the PDN-GW is an L-GW and the PDN connection is a SIPTO at a Local Network PDN connection, the PDN-GW determines if the (H)eNB that the UE is accessing has direct connectivity to the PDN-GW based on the User Location Information IE and/or User CSG Information IE received in step 9. If neither IE is available, the PDN-GW determines that the serving (H)eNB does not have direct connectivity to the PDN-GW. If the PDN- GW determines that the serving (H)eNB does not have direct connectivity to the PDN GW, the PDN-GW initiates PDN-GW initiated Bearer Deactivation procedure with "reactivation requested" cause value as specified in 5.4.4.1.

Figure 9:
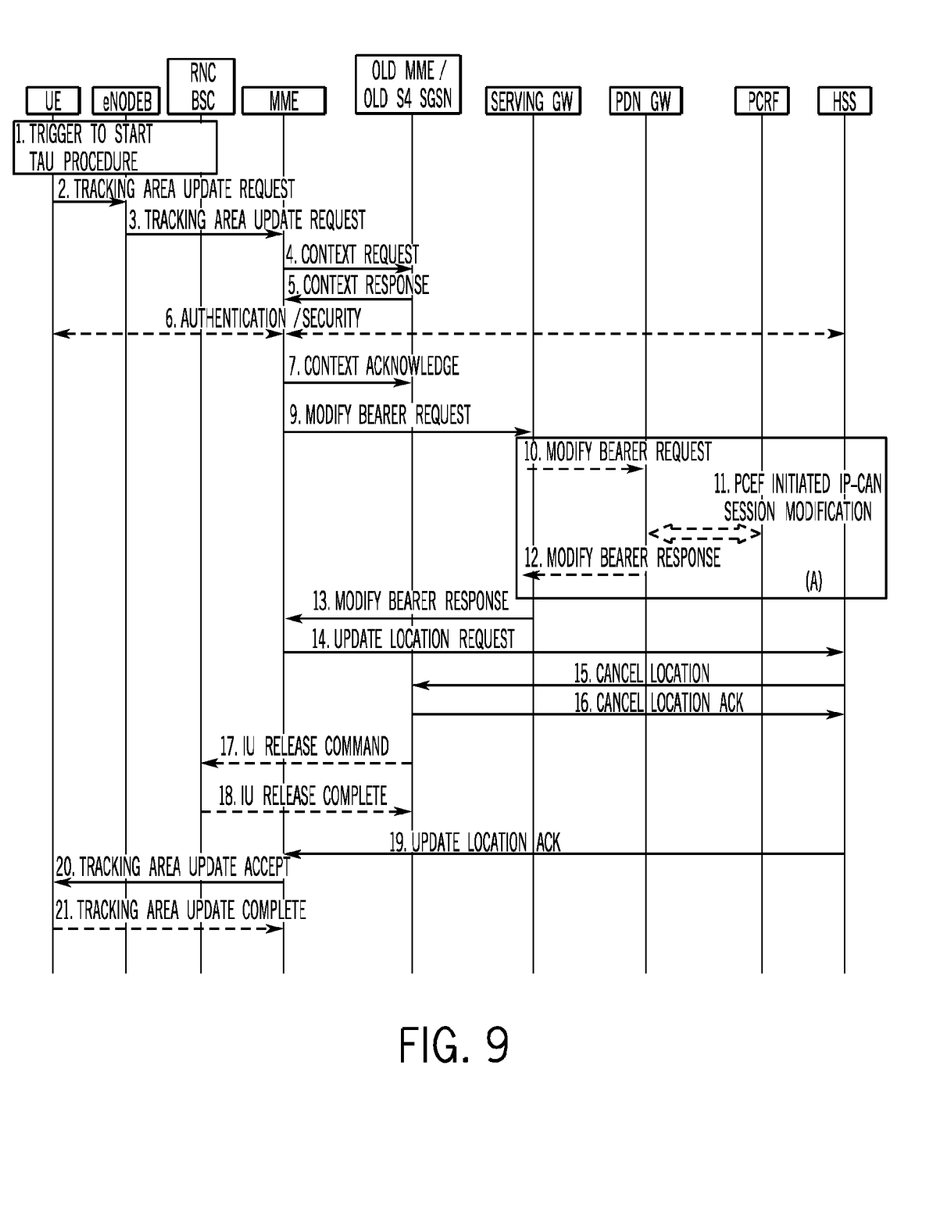

FIG. 9 is an example message flow diagram relating to an E-UTRAN tracking area update procedure without S-GW change, based on a figure from Section 5.3.3.2 of 3GPP TS 23.401. In FIG. 9, the Modify Bearer Request message in step 10 can include a ULI of the UE, similar to message 422 in FIG. 4, and the PDN-GW can perform the function of task 428 in FIG. 4. Section 5.3.3.2 can be updated to include the following language (or language similar to the following language):

If the PDN-GW is an L-GW and the PDN connection is a SIPTO at a Local Network PDN connection, the PDN-GW determines if the (H)eNB that the UE is accessing has direct connectivity to the PDN-GW based on the User Location Information IE and/or User CSG Information IE received in step 10. If neither IE is available, the PDN GW determines that the serving (H)eNB does not have direct connectivity to the PDN GW. If the PDN GW determines that the serving (H)eNB does not have direct connectivity to the PDN GW, the PDN GW initiates PDN GW initiated Bearer Deactivation procedure with "reactivation requested" cause value as specified in 5.4.4.1.

Section 5.5.1.1.1 of 3GPP TS 23.401, which relates to X2-based handover, can be updated to include the following language (or language similar to the following language):

If the PDN-GW is an L-GW and the PDN connection is a SIPTO at a Local Network PDN connection, the PDN-GW determines if the target (H)eNB that the UE is accessing has direct connectivity to the PDN-GW based on the User Location Information IE and/or User CSG Information IE received in a Modify Bearer Request. If neither IE is available, the PDN GW determines that the target (H)eNB does not have direct connectivity to the PDN-GW. If the PDN-GW determines that the target (H)eNB does not have direct connectivity to the PDN-GW, the PDN-GW initiates PDN-GW initiated Bearer Deactivation procedure with "reactivation requested" cause value as specified in 5.4.4.1 after sending the Modify Bearer Response message.

Section 5.5.1.2.1 of 3GPP TS 23.401, which relates to S1-based handover, can be updated to include the following language (or language similar to the following language):

If the PDN-GW is an L-GW and the PDN connection is a SIPTO at a Local Network PDN connection, the PDN-GW determines if the target (H)eNB that the UE is accessing has direct connectivity to the PDN-GW based on the User Location Information IE and/or User CSG Information IE received in a Modify Bearer Request. If neither IE is available, the PDN-GW determines that the target (H)eNB does not have direct connectivity to the PDN GW. If the PDN-GW determines that the target (H)eNB does not have direct connectivity to the PDN-GW, the PDN-GW initiates PDN-GW initiated Bearer Deactivation procedure with "reactivation requested" cause value as specified in 5.4.4.1 after sending the Modify Bearer Response message.

Section 5.5.2.0 of 3GPP TS 23.401, which relates to inter-radio access technology handover, can be updated to include the following language (or language similar to the following language):

If the PDN-GW is an L-GW and the PDN connection is a SIPTO at a Local Network PDN connection, the PDN-GW determines if the target (H)eNB that UE is accessing has direct connectivity to the PDN-GW based on the User Location Information IE and/or User CSG Information IE received in a Modify Bearer Request. If neither IE is available, the PDN-GW determines that the target (H)eNB does not have direct connectivity to the PDN-GW. If the PDN-GW determines that the target (H)eNB does not have direct connectivity to the PDN-GW, the PDN-GW initiates PDN-GW initiated Bearer Deactivation procedure with "reactivation requested" cause value as specified in 5.4.4.1 after sending the Modify Bearer Response message.

Modifications of the 3GPP TS 23.401 Specification for Solution 2 (Deactivation Based on Uplink Data)

Section 4.3.15a.x of 3GPP TS 23.401, which relates to SIPTO at a local network function, can be updated to include the following language (or language similar to the following language):

As IP data session continuity for SIPTO at the Local Network PDN connection is not supported in this release of the specification, the L-GW initiates Bearer Deactivation procedure with "reactivation requested" cause value as specified in 5.4.4.1 if a UL message is received from a S-GW in the Core Network for a SIPTO at the Local Network PDN connection.

Section 4.3.15a.y of 3GPP TS 23.401, which relates to SIPTO at a local network function with standalone gateway, can be updated to include the following language (or language similar to the following language):

As IP data session continuity for SIPTO at the Local Network PDN connection is not supported in this release of the specification, if SIPTO at the Local Network with an Local GW function is active for a PDN connection, and if the cell accessed by the UE does not link to the Local GW where the UE initiated the SIPTO at the Local Network PDN connection, upon completion of the mobility procedure the MME shall deactivate the SIPTO at the Local Network PDN connection with the "reactivation requested" cause value according to clause 5.10.3. If the UE has no other PDN connection, the MME initiates the "explicit detach with reattach required" procedure according to clause 5.3.8.3. In case of inter-MME mobility, the source MME shall provide an indication whether a PDN connection is a SIPTO at the Local Network PDN connection.

Section 4.3.15a.z of 3GPP TS 23.401, which relates to a SIPTO at a local network function collocated with an (H)eNB, can be updated to include the following language (or language similar to the following language):

As IP data session continuity for the SIPTO at the Local Network PDN connection is not supported in this release of the specification, if SIPTO at the Local Network with an Local GW function is active for a PDN connection, and if the cell accessed by the UE does not link to the Local GW where the UE initiated the SIPTO at the Local Network PDN connection, upon completion of the mobility procedure the MME shall deactivate the SIPTO at the Local Network PDN connection with the "reactivation requested" cause value according to clause 5.10.3. If the UE has no other PDN connection, the MME initiates the "explicit detach with reattach required" procedure according to clause 5.3.8.3. In case of inter-MME mobility, the source MME shall provide an indication whether a PDN connection is a SIPTO at the Local Network PDN connection.

System Architecture

Figure 10:
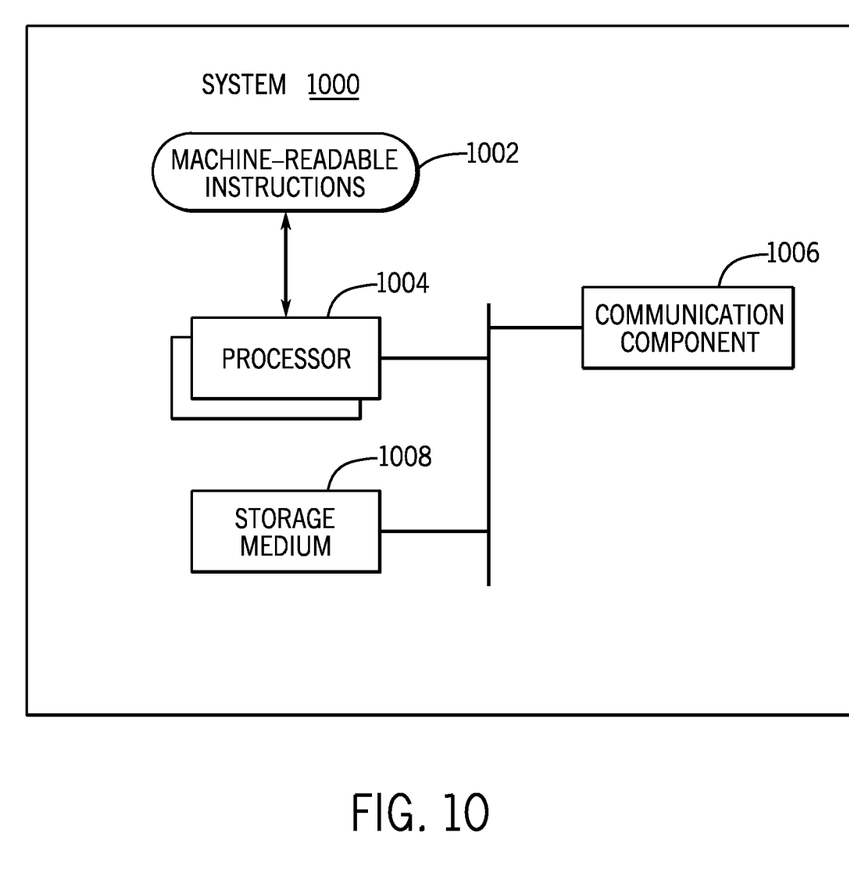
FIG. 10 is a block diagram of an example system according to some implementations.

FIG. 10 is a block diagram of an example system 1000, which can be any of the network nodes discussed above, including an (H)eNB, L-GW, PDN-GW, S-GW, MME, UE, and so forth. The system 1000 includes machine-readable instructions 1002 that are executable on one or more processors 1004, for performing any of the various tasks discussed above. A processor can include a microprocessor, microcontroller, processor module or subsystem, programmable integrated circuit, programmable gate array, or another control or computing device.

The processor(s) 1004 can be coupled to a communication component 1006 (which is a transceiver) to allow for communication with another node. In addition, the processor(s) 1004 can be coupled to a machine-readable or computer-readable storage medium 1008 that stores data.

The storage medium 1008 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method in a packet data network (PDN) gateway, the method comprising:
receiving, by the PDN gateway, a message associated with a user equipment (UE) having a PDN connection with the PDN gateway, the PDN connection bypassing a core network of a mobile communications network;
determining, by the PDN gateway, that the UE is not accessing a network node that has a predetermined association with the PDN gateway, wherein the determining comprises one of:
comparing, by the PDN gateway, user location information in the received message with stored information at the PDN gateway, or
determining, by the PDN gateway, that uplink data transmitted by the UE is received from an external network node that is external of a node containing the PDN gateway; and
in response to the determining that the UE is not accessing the network node that has the predetermined association with the PDN gateway, deactivating the PDN connection, wherein deactivating the PDN connection comprises deactivating a Selected Internet Protocol Traffic Offload (SIPTO) PDN connection with a "reactivation requested" cause value.

2. The method of claim 1, wherein determining whether the UE is not accessing the network node that has the predetermined association with the PDN gateway includes determining that the UE is not accessing the network node that has a direct connectivity between the network node and the PDN gateway.

3. The method of claim 1, wherein the determining that the uplink data is received from the external network node is based on an address associated with the external network node from which the uplink data is received.

4. The method of claim 1, wherein receiving the message comprises receiving the message from a control node of the core network.

5. The method of claim 1, wherein receiving the message comprises receiving the message from a serving gateway of the core network.

6. The method of claim 1, further comprising:
deactivating the PDN connection based on a period of time elapsing.

7. The method of claim 1, further comprising:
stopping a timer in response to detecting that the UE is accessing any network node that has the predetermined association with the PDN gateway.

8. The method of claim 1, wherein the PDN gateway is a local PDN gateway, and wherein the determining that the UE is not accessing the network node that has the predetermined association with the local PDN gateway is performed by the local PDN gateway, and wherein the deactivating is performed by the local PDN gateway.

9. The method of claim 8, wherein the local PDN gateway is part of a local network that is separate from the core network, the core network comprising a control node and a PDN gateway.

10. The method of claim 1, wherein the message includes one of a Modify Bearer Request message or a Create Session Request.

11. The method of claim 1, wherein the UE is determined to not be accessing the network node that has the predetermined association with the PDN gateway in response to the comparing indicating that the user location information in the received message does not match the stored information at the PDN gateway.

12. A packet data network (PDN) gateway, comprising:
a transceiver to communicate with a core network of a mobile communications network; and
at least one processor to:
send a first message to request that a control node of the core network report location information of a user equipment (UE) in response to the UE changing location;
receive a second message containing the location information of the UE that has a PDN connection with the PDN gateway, the PDN connection bypassing the core network;
based on the second message, determine that the UE is not accessing a network node that has a predetermined association with the PDN gateway, wherein the determining comprises comparing the user location information in the received second message with stored information at the PDN gateway; and in response to the determining that the UE is not accessing the network node that has the predetermined association with the PDN gateway, deactivate the PDN connection, wherein the deactivating of the PDN connection comprises deactivating a Selected Internet Protocol Traffic Offload (SIPTO) PDN connection with a "reactivation requested" cause value.

13. The PDN gateway of claim 12, wherein the first message is sent as part of a procedure to activate a PDN connection for the UE.

14. The PDN gateway of claim 12, wherein the first message includes a Create Session Response message.

15. The PDN gateway of claim 14, wherein the second message includes one of a Modify Bearer Request message or a Create Session Request.

16. The PDN gateway of claim 12, wherein the second message is from the control node or another control node.

17. The PDN gateway of claim 12, wherein the PDN gateway is a local PDN gateway that is part of a local network separate from the core network that comprises the control node and a PDN gateway.

18. The PDN gateway of claim 12, wherein the predetermined association is a direct connectivity between the network node and the PDN gateway.

19. A control node comprising:
a transceiver; and
at least one processor to:
receive a first message through the transceiver, the first message sent by a local packet data network (PDN) gateway and requesting that the control node, which is part of a core network of a mobile communications network, report location information of a user equipment (UE) in response to the UE changing location; and
responsive to mobility of the UE between a first wireless access network node and a second wireless access network node, send a second message containing the location information of the UE for receipt by the local PDN gateway, to cause the local PDN gateway to deactivate a PDN connection of the UE in response to determining, based on comparing the location information of the UE in the second message to stored information at the local PDN gateway, that the UE is not accessing a network node that has a predetermined association with the local PDN gateway, the local PDN gateway being separate from the core network, wherein the deactivating of the PDN connection comprises deactivating a Selected Internet Protocol Traffic Offload (SIPTO) PDN connection with a "reactivation requested" cause value.

* * * * *